United States Patent [19]

Economou et al.

[11] 3,909,348
[45] Sept. 30, 1975

[54] UREA-FORMALDEHYDE PIGMENTARY FILLERS USED IN PAPER

[75] Inventors: Peter Economou, Bedford; John F. Hardy, Andover, both of Mass.; Alfred Renner, Muenchenstein, Switzerland

[73] Assignees: Cabot Corporation, Boston, Mass.; Ciba-Geigy AG, Basel, Switzerland

[22] Filed: Sept. 9, 1974

[21] Appl. No.: 504,104

Related U.S. Application Data

[63] Continuation-in-part of Ser. No. 390,323, Aug. 21, 1973, abandoned, which is a continuation-in-part of Ser. No. 2,427, Jan. 12, 1970, abandoned.

[52] U.S. Cl. .............................. 162/166; 260/69 R
[51] Int. Cl.² ........................................... D21H 3/52
[58] Field of Search ............ 162/166, 167; 260/69 R

[56] References Cited
UNITED STATES PATENTS

| | | | |
|---|---|---|---|
| 3,006,561 | 10/1961 | Eberl et al. | 241/29 |
| 3,037,903 | 6/1962 | Baumann | 162/165 |
| 3,393,161 | 7/1968 | Avis et al. | 260/2.5 F |
| 3,428,607 | 2/1969 | Renner | 260/67.6 R |
| 3,509,098 | 4/1970 | Curchod et al. | 260/67.6 R |
| 3,553,115 | 1/1971 | Curchod et al. | 260/3 |
| 3,849,378 | 11/1974 | Griffiths et al. | 162/166 |

FOREIGN PATENTS OR APPLICATIONS

| | | |
|---|---|---|
| 1,071,307 | 6/1967 | United Kingdom |
| 875,945 | 8/1961 | United Kingdom |

OTHER PUBLICATIONS

Casey, J. P., "Pulp & Paper", Vol. II, Sec. Ed., Interscience Publishing, N.Y., N.Y., 1960, pp. 985-990.

*Primary Examiner*—S. Leon Bashore
*Assistant Examiner*—William F. Smith
*Attorney, Agent, or Firm*—Jack Schuman; Barry R. Blaker; Lawrence A. Chaletsky

[57] ABSTRACT

This disclosure relates to the use of certain insoluble, infusible, non-porous, particulate urea-formaldehyde polymers having a molar ratio of urea to formaldehyde ranging from about 1:1.3 to about 1:1.8 as pigmentary fillers in the preparation of paper products having improved properties.

10 Claims, No Drawings

UREA-FORMALDEHYDE PIGMENTARY FILLERS USED IN PAPER

This application is a continuation-in-part of copending application Ser. No. 390,323, filed Aug. 21, 1973 now abandoned, which in turn is a continuation of application Ser. No. 2,427, filed Jan. 12, 1970, now abandoned.

This invention relates to the production of new and useful paper products filled with pigmentary polymers. More particularly, this invention relates to new and improved paper products filled with pigmentary polymers which impart to the paper base sheet or board a variety of unique physical properties. The properties include brightness, opacity, retention and bulk as a result of the low density of the polymeric pigment and the highly structured nature of the pigment agglomerates.

Normally, in the paper industry large quantities of inorganic pigments such as talc, kaolin, calcium carbonate, zinc sulphide, clay, titanium dioxide and the like are employed as fillers in the production of paper products. Ordinarily, such inorganic pigments are effective in the preparation of paper products having improved properties of brightness, opacity, basis weight, softness, smoothness, finish and/or ink absorption. In addition, to be acceptable to the paper industry, a chemical additive for paper must be one which does not migrate from the base sheet to adjacently held absorbent material. The additive must not cause "blocking" or sticking together of paper when it is rolled up or stacked sheet upon sheet. While conventional pigments suitably perform in meeting most of the requirements in the papermaking process, the polymeric pigments of the present invention provide still further improvements in the properties of brightness, opacity and retention. In addition, as a result of the low specific gravity of the pigments of this invention and also the highly structured nature of the pigment agglomerates, it is possible to prepare such improved paper products which are also highly bulked or lower in density.

Accordingly, it is a principal object of this invention to provide a pigmentary filler for paper products which, while being optically effective, is excellently self-retained and is useful in preparing high bulk paper products.

Other objects and advantages of the present invention will be apparent to those skilled in the art from the following detailed description and claims.

In accordance with this invention, it has been found that the above and still further objects are accomplished by incorporating in the preparation of paper products as pigmentary fillers, certain insoluble, infusible, non-porous particulate urea-formaldehyde polymers. In particular, the fillers comprise insoluble, infusible, non-porous particulate urea-formaldehyde polymers having a molar ratio of urea to formaldehyde ranging from about 1:1.3 to about 1:1.8, a BET (Brunauer-Emmett-Teller Method as described in the Journal of the American Chemical Society, 1938, vol. 60, page 309) surface area ranging from about 5 to 50 square meters per gram, and preferably a volatiles content ranging from about 1 to about 30 percent by weight based on the weight of dry urea-formaldehyde polymer. The pigments of this invention are also characterized by having an absorption capacity for aqueous starch solution of 3.0 to 8.0 gms/gm pigment and a mean agglomerate size of 3.0 to 12.0 microns.

In determining mean agglomerate sizes, a satisfactory rating of the state of agglomeration of the insoluble pigments of this invention can be made by using the Coulter Counter in accordance with the following conditions. The Coulter Counter instrument registers the change in electrical resistivity of an electrolyte solution in which a very low concentration of inert solid particles has been thoroughly suspended as the suspension flows through a small aperture which in this case is 100 micron size between two electrodes. In the present case an amount of about 0.1 gms of the urea-formaldehyde pigment powder is placed in a covered container along with 100 cc. of an aqueous solution containing 2 percent by weight sodium chloride. The resulting suspension is then thoroughly agitated manually as, for example, by shaking vigorously 50 times. A small amount of this suspension, that is about 1 cc., is added to 150 milliliters of an aqueous solution containing 2 percent by weight of sodium chloride. The electrical impulses are analyzed by the Coulter Counter using a 100 micron aperture tube on the assumption that the change in electrical resistivity is proportional to the volumes of the individual particles passing through the aperture. From these data, a mean agglomerate size, that is the 50 percent weight average, is determined and reported.

The capacity of the urea-formaldehyde pigment for absorbing liquids is rated by running a "wetting out" test similar to the standard oil absorption test set forth in ASTM D-281-31 except that the liquid used is not oil but an aqueous solution of approximately 8 percent starch by weight.

Generally speaking, amounts ranging from about 0.5 to about 80 percent by weight of pigment based on the weight of the dry pulp slurry treated are employed. In a preferred embodiment, the pigments of the present invention are utilized in amounts of from about 0.5 to about 30 percent by weight based on the weight of the dry pulp. However, in a still further preferred embodiment of the present invention, the pigment is used in amounts ranging from about 0.5 to about 15 percent by weight based on the weight of the dry pulp.

In preparing the paper products according to the present invention, there is suitably employed any type of paper pulp conventionally used in the manufacture of paper. Thus, there may be utilized, as a paper stock, a chemically treated pulp, a mechanically ground pulp or mixtures of any of these. In addition, pulps obtained from plants and rags are satisfactory as pulp components in making paper products. Moreover, in the instances where it is not usually necessary or desirable to employ virgin pulp as the pulp component, cuttings or scraps of paper obtained during a process for manufacturing paper may be used alone or in combination with virgin pulp. The scraps, commonly referred to as the "broke", may be added to the virgin pulp either in dry form or as an aqueous slurry.

As stated above, the products which are particularly well adapted for incorporation as pigmentary fillers in the paper products comprise, generally, insoluble, infusible, non-porous, particulate urea-formaldehyde polymers. More specifically, the fillers utilized in preparing the paper products of the present invention are pigmentary, insoluble, infusible, non-porous, particulate urea-formaldehyde polymers having a molar ratio of urea to formaldehyde ranging from about 1:1.3 to about 1:1.8, a specific surface area, according to BET technique, ranging from about 5 to 50 square meters per gram, a mean agglomerate size of 3 to 12 microns and an absorption capacity of 3 to 8 gms/gm pigment. Preferably, the polymers to be utilized have an absorption capacity of 4 to 8 gms/gm. In a further preferred embodiment, the polymers have an absorption capacity of 4.5 to 7.3 gms/gm and a mean agglomerate size of 5 to 10 microns. In an especially preferred embodiment, the polymers have a surface area of 10 to 40 $m^2/g$, an absorption capacity of 4.7 to 7.0 gms/gm pigment and a mean agglomerate size of 5.5 to 9.0 microns. The volatiles content as defined herein is intended to mean the amount of volatile materials susceptible of removal from the urea-formaldehyde pigment by subjecting the pigment to a temperature of about 135°C for a period of about 2 hours in a vacuum drying oven maintained at a pressure of 0.01 millimeters of mercury. As indicated, the pigments may have a volatiles content ranging from about 1 to about 30 percent by weight based on the weight of dry urea-formaldehyde pigment and preferably a volatiles content ranging from about 5 to about 25 percent by weight.

The urea-formaldehyde pigments of the present invention are readily prepared. For example, the insoluble, infusible pigments, which are prepared so as to contain a molar ratio of from about 1:1.3 to about 1:1.8 of urea to formaldehyde, are produced by initially reacting urea with formaldehyde in an aqueous solution to form a precondensate thereof and subsequently curing the aqueous precondensate, in the presence of a suitable curing catalyst and at elevated temperatures, to produce a gel or a precipitate which is insoluble and infusible. The resultant urea-formaldehyde polymer gel is neutralized and recovered by filtration or centrifugation and is dried by any conventional technique such as spray drying, air drying, azeotropic distillation or other means for effecting contact and convection drying. The product is then comminuted or deagglomerated to a finely divided form utilizing any suitable means such as a pounding mill, a roller mill, an impact mill or an air jet mill.

The acid curing catalysts suitable for use in preparing the insoluble, infusible, crosslinked urea-formaldehyde pigmentary polymers of the present invention include any of the conventional acid catalysts such as sulfuric acid, hydrochloric acid, nitric acid; acid, phosphoric acid, hydrochloric acid, nitric acid; organic acids of medium strength having a pK value less than 4 such as formic, oxalic, maleic, succinic and chloroacetic acids; and the like. It is preferred, however, to employ as the acid curing catalyst sulfamic acid or a water-soluble ammonium hydrogen sulfate having the general formula, $RNH_3SO_4H$, wherein R is a radical selected from the group consisting of hydrogen, alkyl, cycloalkyl, hydroxyalkyl, aralkyl or aryl. Exemplary water-soluble ammonium hydrogen sulfates are ammonium hydrogen sulfate, methylammonium hydrogen sulfate, ethylammonium hydrogen sulfate, hydroxyethylammonium hydrogen sulfate, phenylammonium hydrogen sulfate, benzylammonium hydrogen sulfate and the like.

In an optional preferred embodiment of the present invention, water-soluble macromolecular organic substances which greatly increase the viscosity of aqueous solutions, referred to hereinafter as protective colloids, may be present in the reaction mass during the precipitation of the urea-formaldehyde condensation products. Typical examples of such protective colloids are natural substances such as starch, gelatin, glue, tragacanth, agar agar and gum arabic; alkali metal natural substances such as carboxymethylcellulose, the alkali salts of carboxymethylcellulose, particularly the sodium salt of carboxymethylcellulose, methylcellulose, ethylcellulose, betahydroxyethylcellulose, alkali alginates and the like, synthetic polymers such as polyvinyl alcohol, polyvinyl pyrrolidone, water-soluble polymers and copolymers of arcylic or methacrylic acids and alkali metal salts thereof, salts of maleic acid-containing copolymers, styrene-maleic anhydride copolymers, polyhydrochlorides of homopolymers and copolymers of vinylpyridine and the like. The amounts of protective colloids to be employed are dependent on the type, chemical structure and molecular weight thereof. However, the protective colloids are generally used in amounts ranging from about 0.1 to about 10 percent by weight based on the weight of the urea and formaldehyde reactants. Preferably, amounts of the protective colloid ranging from about 0.5 to about 5 percent by weight based on the weight of the urea and formaldehyde reactants are used. In practice, the protective colloid may be added at any stage during the formation of the urea-formaldehyde pigments prior to the point at which the urea-formaldehyde precondensate is formed into a gel or precipitate.

In a particularly preferred embodiment of the present invention, the urea-formaldehyde polymers useful as pigmentary fillers in paper are prepared by a process which entails the use of sulfamic acid or a water-soluble ammonium hydrogen sulfate as hereinbefore defined as a curing catalyst. When using a curing catalyst often than sulfamic acid or a water-soluble ammonium hydrogen sulfate, it is desirable to add the curing catalyst to a precondensate of urea and formaldehyde which contains a protective colloid. In more detail, a precondensate of urea and formaldehyde having a molar ratio of from about 1:1.3 to about 1:1.8 of urea to formaldehyde is formed at a temperature varying from about 40° to about 100°C and at a pH range of from about 6 to about 9 and for a period of time sufficient to permit the greater portion of the formaldehyde to be reacted with the urea. When utilized, the protective colloid, such as the sodium salt of carboxymethylcellulose, is added to the precondensate at any time during the production thereof, or is added separately as a solution to an initially prepared precondensate. To the resultant precondensate there is then added, with agitation, a solution of the desired curing catalyst at a temperature ranging from room temperature to about 100°C until a crosslinked gel is formed. The gel is subsequently comminuted by suitable means such as a cutter-granulator or the like. The resultant reaction product, which is a solid, infusible and insoluble urea-formaldehyde polymeric condensation product, is neutralized with an aqueous solution of a base. Thereafter, the slurry is dewatered by filtration or centrifugation, dried by any conventional technique and then deagglomerated by means of an impact mill or an air jet mill.

In general, the pigmentary filled paper products of this invention are readily prepared by forming a slurry of the pulp component, intimately admixing the pigmentary filler, either in dry or slurry form, with the pulp slurry, forming the water-insoluble components into a paper web upon the wire of a conventional paper-making machine such as a Fourdrinier machine, dewatering, drying and calendering the paper web into final form. The pigmentary fillers of the present invention may be added to the pulp at any convenient stage during the manufacture of the paper product prior to the formation of sheets from the fibrous pulp, and, furthermore, the crosslinked polymers may be added as more or less dry powders or as a slurry. For example, the fillers may be added to a hydropulper, jordan, or other pulp refining and preparation device, and, particularly, as a wet-end additive at the beater stage, during the paper-making process. It is desirable that the fillers be thoroughly distributed and dispersed throughout the pulp and, in order to achieve this optimum dispersion, any conventional means for stirring, dispersing or mixing can be employed. The filled pulp system is then formed into paper or board on a conventional Fourdrinier or cylinder paper-making machine.

For many purposes, it may be desirable to incorporate other conventional paper additives or modifiers in the pigmented pulp system. For example, during the preparation of paper products, it is common practice to add conventional sizing agents such as rosin size, i.e., sodium resinate, and a size precipitant such as aluminum salts, particularly alum or aluminum sulfate, titanic sulfate and the like, as well as neutral sizing agents and their promoters. In addition, the properties of the paper products may be modified by blending with the pulp system natural and synthetic bonding agents and adhesives, dyes, detergents, wetting agents and the like. It will be apparent that paper products containing such other additives are within the scope of this invention.

The invention will be more readily understood by reference to the following examples which describe the advantageous and unexpected results achieved by the use of the pigmentary fillers of the present invention in the preparation of paper products. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

In the following examples there are described representative insoluble, infusible, non-porous urea-formaldehyde polymers useful as pigmentary fillers with the present invention and methods for the preparation thereof.

EXAMPLE A

To a suitable stainless steel reaction vessel, equipped with means for addition and removal of heat, means for agitation and temperature recording means, there are charged 15.75 parts by weight of water and 22.5 parts by weight of an aqueous 30 percent formaldehyde solution. The mixture is heated to a temperature of about 70°C and the pH value is adjusted to 7 with a solution of sodium hydroxide. There is then added with agitation 9 parts by weight of urea. Upon completion of the addition of the urea, the temperature of the reaction mixture is held at about 70°C and the pH value at 7 while the condensation reaction proceeds for a period of about 2 hours. The resultant precondensate reaction mixture is then cooled to a temperature of about 50°C and is rapidly mixed with a curing catalyst-containing solution comprising 0.485 parts of sulfamic acid dissolved in 15.75 parts of water which solution is maintained at a temperature of 50°C. Formation of a gel commences after a 12 second period, at which time the temperature of the reaction mixture rises to about 60° to 65°C. The gel thus obtained is maintained under adiabatic conditions at a temperature of about 65°C for about 2 hours. The resultant gel is then comminuted to a granular size of from about 1 to about 2 millimeters in a conventional cutting granulator apparatus, slurried with an equal amount of water and neutralized to a pH value of 7.5 with a solution of sodium carbonate. The solid product is recovered by filtration, dried at 110°C in a stream of hot air for 5 hours and cooled to room temperature. The resultant product is then deagglomerated by passing the product through a high speed, i.e., 20,000 rpm, pin mill. There is obtained 13.6 parts by weight of a fine, white, powdery, non-porous, insoluble and infusible urea-formaldehyde polymer having a BET specific surface area of about 28.1 $m^2/g$, a molar ratio of urea to formaldehyde of 1:1.5 and a volatiles content of 15.8 percent by weight based on the weight of the polymer. The volatiles content of the particulate polymer is determined in a drying oven maintained at 135°C and 0.01 millimeters of mercury over a 2 hour period as described hereinabove. The mean agglomerate size of the pigment is 8.3 microns and the absorption capacity is 5.7 gms/gm pigment as determined herein. The product obtained in this example is referred to hereinafter as U/F-1.

EXAMPLE B

To a suitable reaction vessel having means for the addition and removal of heat, means for measuring the temperature of the reaction mass and means for agitating the reaction mass, there is charged a solution comprising 0.315 parts by weight of a sodium salt of a high molecular weight carboxymethylcellulose of the type 7HP sold by Hercules, Inc., dissolved in 15.75 parts by weight of water. To this solution 22.5 parts by weight of an aqueous 30 percent formaldehyde solution are added and the resultant mixture is heated to a temperature of about 70°C and adjusted to a pH value of about 7 with a sodium hydroxide solution. There is then added with agitation 9 parts by weight of urea. Upon completion of the addition of the urea, the condensation reaction is allowed to proceed, with agitation, for a period of 2 hours while the temperature of the reaction mixture is held at about 70°C and the pH is maintained at a value of about 7. The precondensate reaction product thus obtained is cooled to a temperature of about 50°C and rapidly mixed with a crosslinking agent-containing solution comprising 0.441 parts of sulfuric acid dissolved in 15.75 parts of water which has been heated to a temperature of about 50°C. Gel formation occurs following a period of 7 seconds at which time the temperature of the reaction mixture rises to about 65°C. The gel is maintained under adiabatic conditions for 2 hours at a temperature of 65°C. Thereafter, the gel is comminuted to a granular size of about 1 to 2 millimeters in a cutter granulator, slurried with an equal volume of water and neutralized to a pH value of 7.5 with a sodium carbonate solution. The resultant solid material is separated by filtration, dried for 5 hours at 110°C in a stream of air, cooled to room temperature and deagglomerated by passage thereof through a pin mill operating at 20,000 rpm. There is obtained 13.6 parts by weight of a fine, white, powdery, non-porous, insoluble and infusible urea-formaldehyde polymer having a BET specific surface area of about 31.8 m²/g, a molar ratio of urea to formaldehyde of 1:1.5 and a volatiles content of 17.9 percent by weight based on the weight of the polymer determined as described earlier. The mean agglomerate size of this pigment is 7 microns and the absorption capacity is 5 gms/gm pigment. The polymer of this example is hereinafter referred to as U/F-2.

EXAMPLE C

Following the procedure of Example B, a solution of 0.315 parts by weight of sodium carboxymethylcellulose dissolved in 16.08 parts by weight of water is charged into the reaction vessel. To this solution 22.5 parts by weight of an aqueous 30 percent formaldehyde solution are added and the resultant mixture is heated to a temperature of about 70°C and adjusted to a pH value of about 7 with the use of a 10 percent sodium hydroxide solution. There is then added with agitation 9 parts by weight of urea and 0.488 liters of 17.75 percent solution of ammonia. The condensation reaction proceeds, with agitation, for a period of 2 hours while the temperature is maintained at about 70°C and the pH is maintained at a value of about 7. The resultant precondensation reaction product is then rapidly mixed with a curing agent solution comprising 0.5 parts of sulfuric acid dissolved in 15 parts of water. The mixture is stirred and gel formation occurs following a period of 5 seconds. After a two hour period during which the gel is maintained at about 70°C, the gel is comminuted, slurried with water, and neutralized to a pH value of 7.5 with a 10 percent sodium carbonate solution. The resultant solid material is separated by centrifugation, dried at 110°C in a drying oven for a period of 24 hours and deagglomerated by a single passage thereof through a pin mill operating at 19,000 rpm. There is obtained a fine, white, particulate, non-porous, insoluble and infusible urea-formaldehyde pigment having a BET specific surface area of about 30 m²/g, a molar ratio of urea to formaldehyde of 1:1.5, a volatiles content of 12.4 percent by weight, a mean agglomerate size of 10 microns and an absorption capacity of 3.6 gms/gm pigment. The polymer of this example is hereinafter referred to as U/F-3.

EXAMPLE D

In accordance with the procedure of Example B, a solution of 0.126 parts by weight of the sodium salt of dodecylbenzene sulfonic acid dissolved in 12.9 parts by weight of water is placed into a reaction vessel into which there is then added 9 parts by weight of an aqueous 30 percent formaldehyde solution. The resultant mixture is heated to a temperature of about 70°C and adjusted to a pH value of about 7 by means of a 10 percent sodium hydroxide solution. There is then added with stirring 3.6 parts by weight of urea whereupon the condensation reaction proceeds, with agitation, for a period of 2 hours while the temperature is maintained at about 70°C and the pH is maintained at a value of about 7. The resultant precondensation reaction product is then rapidly mixed with a solution of 0.194 parts sulfamic acid dissolved in water. The mixture is stirred and gel formation occurs following a period of 5 seconds. Thereafter, the gel is maintained at 70°C for a period of 2 hours, following which the gel is comminuted, slurried with water and neutralized to a pH of 7.5 with a 10 percent sodium carbonate solution. The product is separated by centrifugation, dried at 110°C in a drying oven for 24 hours and deagglomerated by twice passing the product through a pin mill operating at 20,000 rpm. The product obtained is a white, particulate, non-porous, insoluble and infusible urea-formaldehyde pigment having a BET specific surface area of 17.7 m²/g, a molar ratio of urea to formaldehyde of 1:1.5, a volatiles content of 4.4 percent by weight, a mean agglomerate size of 5.6 microns, and an absorption capacity of 4.1 gms/gm pigment. This product is subsequently referred to as U/F-4.

EXAMPLE E-F

Following the procedure of Example A and utilizing a molar ratio of urea to formaldehyde of 1:1.5, Examples E and F, hereinafter referred to as U/F-5 and U/F-6, respectively, are prepared. The properties of these pigments, as well as the properties of the pigments of Examples A through D, are provided in Table A hereinbelow.

TABLE A

| Example No. | Pigment Designation | Molar Ratio, Urea to Formaldehyde | BET Specific Surface Area m²/g | % Volatiles (2 hrs; 135°C; 0.01 mm Hg) | Mean Agglomerate Size, Microns | Absorption Capacity gms/gm pigment |
|---|---|---|---|---|---|---|
| A | U/F-1 | 1:1.5 | 28.1 | 15.8 | 8.3 | 5.7 |
| B | U/F-2 | 1:1.5 | 31.8 | 17.9 | 7 | 5 |
| C | U/F-3 | 1:1.5 | 30 | 12.4 | 10 | 3.6 |
| D | U/F-4 | 1:1.5 | 17.7 | 4.4 | 5.6 | 4.1 |
| E | U/F-5 | 1:1.5 | 23.2 | 12.9 | 7 | 5.2 |
| F | U/F-6 | 1:1.5 | 28.0 | 14.5 | 6.9 | 6.7 |

The physical properties of paper products containing as fillers the infusible, insoluble, non-porous urea-formaldehyde pigments of this invention under various test conditions is illustrated by the following detailed examples which show the advantageous and unexpected results achieved by utilizing such additives therein. It is, however, not intended that this invention be limited by or to such examples. The following testing procedures, which are TAPPI (Technical Association Paper Pulp Industry) standard measurement methods, are used in evaluating the physical properties of the pigmentary filler-containing paper products. The samples of paper are conditioned, prior to testing, by exposure thereof to an atmosphere maintained at a temperature of 23°C and a 50 percent relative humidity in accordance with TAPPI T402 m-49. Additionally, the values determined for the physical properties have been corrected so as to recite values obtained for samples of paper having a basis weight of 50 pounds per TAPPI ream of 500 sheets having a trade size of 25 × 40 inches or bookream of 500 sheets having a trade size of 25 × 38 inches.

Basis Weight — TAPPI T410 os-61
Thickness — TAPPI T411 m-44
Opacity — Utilizing a Bausch and Lomb Opacimeter equipped with a white body having an absolute reflectance of 0.89, the percent opacity adjusted to reflect a value for paper having a basis weight of 50 pounds is determined as shown in TAPPI T425 m-60.

Scattering Coefficient — In accordance with TAPPI Standard T425 m-60 and employing the Kubelka-Munk equations as shown therein to adjust the white body so that it has an absolute reflectance of 0.89, the scattering coefficient per pound of paper is calculated. This measurement is an indication of the fundamental pigmentary quality of the pigment in paper wherein differences in opacity and brightness caused by pulp variations and other variables are eliminated. The scattering coefficients of the pigments in paper are also readily determined in the standard manner set forth in Casey's *Pulp and Paper*, Volume 3, pages 1431 and 1432, and are expressed as bookreams (25×38-500) per pound of pigment.

Bulk — The bulk or specific volume of paper is the volume in cubic centimeters of 1 gram of paper and is determined in accordance with TAPPI T411 m-44. The bulk is the reciprocal of the density of the paper.

Brightness — The percentage brightness is determined using a reflectance meter according to TAPPI Standard T452 m-58. In this instance, the reflectance meter employed is a "Coloreye" tristimulus colorimeter produced by Instrument Development Laboratories, Inc. of Attleboro, Massachusetts.

Pigment Retention — The percentage pigment retention is determined by dividing the weight of pigment retained in a given amount of paper by the weight of pigment added to the same amount of pulp.

EXAMPLES 1-3

Paper products shown in Table I containing varying pigmentary fillers of the present invention are prepared on a Noble and Wood paper making machine. In greater detail, there is charged to a Niagara beater a pulp slurry having a consistency of about 2 percent and comprising 400 grams of oven dried bleached sulfite fiber and 19.6 kilograms of water. The resultant slurry is beaten to a Canadian Standard Freeness (C.S.F.) of approximately 400 milliliters and is then diluted with an additional 37 liters of water to provide an aqueous pulp slurry containing 0.7 percent pulp by weight. A 7.14 liter portion of the pulp having a consistency of 0.7 percent is mixed vigorously with an aqueous dispersion containing the pigment in the desired amount. A one liter portion of the pigmented pulp is diluted with 10 liters of water in the Noble and Wood machine and the wet web formed thereby is dried on the drum drier of the Noble and Wood paper making machine at 240°F for one minute. The handsheets formed thereby are 12 inches square and have a basis weight of approximately 50 pounds per TAPPI ream (25 × 40 inches - 500 sheets). The paper is tested for various properties and the results obtained are given in the following Table I.

TABLE I

| | (90% Bleached Sulfite Pulp and 10% U/F Filler) | | |
|---|---|---|---|
| Example No. | 1 | 2 | 3 |
| Filler Added 10% by weight of dry pulp | — | U/F-3 | U/F-4 |
| C.S.F. mls | 411 | 444 | 386 |
| % Retention | — | 60.6 | 19.4 |
| Paper Scattering Coefficient, TAPPI ream per lb. | 0.039 | 0.052 | 0.049 |
| Pigment Scattering Coefficient, TAPPI ream per lb. | — | 0.272 | 0.592 |
| % Brightness | 87.2 | 90.4 | 89.0 |
| % Opacity corrected for 50 lbs. B.W. | 73.4 | 79.8 | 78.7 |
| Bulk, cc/gm paper | 1.63 | 1.74 | 1.67 |

EXAMPLES 4-8

In these examples, the procedure of Examples 1-3 is followed with the sole exception that the pulp used herein is not bleached sulfite fiber. The pulp used is a mixture, in equal parts (50/50), of bleached hardwood kraft and bleached softwood kraft referred to herein as softwood/hardwood (50/50) bleached kraft pulp. The data obtained on these paper sheets are reported in Table II hereinbelow, and the basis weights are expressed in lbs/bookream.

TABLE II

| | (90% Softwood/Hardwood (50/50) Bleached Kraft Pulp and 10% U/F Filler) | | | | |
|---|---|---|---|---|---|
| Example No. | 4 | 5 | 6 | 7 | 8 |
| Filler Added, 10% by weight of dry pulp | — | U/F-3 | U/F-4 | U/F-5 | U/F-6 |
| % Retention | — | 68.4 | 47.2 | 72.4 | 76.0 |
| Pigment Scattering Coefficient, bookream per lb. | — | 0.284 | 0.570 | 0.600 | 0.700 |
| % Brightness | 83.7 | 88.0 | 87.9 | 89.5 | 90.3 |
| % Opacity, corrected for 50 lbs. B.W. | 75.0 | 82.0 | 84.5 | 87.5 | 89.5 |
| Bulk, cc/gm paper | 1.57 | 1.70 | 1.72 | 1.81 | 1.90 |
| Bulk Increase per % Pigment in Paper, % | — | 1.20 | 2.02 | 2.11 | 2.77 |

From the above data, it is immediately apparent that not only are the optical properties of the paper improved but also there is a significant increase in the bulk property of the paper. It is known that the conventional paper fillers such as clay and titanium dioxide are more dense than cellulose fiber and tend to decrease or have little effect on the bulk of the paper. Conversely, when using the urea-formaldehyde pigments of this invention, the bulk of the sheet is increased by significant amounts ranging from about 1 to about 3 per percent of pigment in the sheet. This, of course, permits the production of a paper sheet having a given thickness or caliper which is of a lower weight than that normally obtained when using conventional prior art pigments such as clay or titanium dioxide.

It is found that similar effective results are also obtained when the fillers utilized in each of Examples 1 through 8 are compared at levels of 3, 6, 8, 12, 15, 20, 30 and 40 percent by weight of the pigmentary fillers based on the weight of the dry pulp.

EXAMPLES 9–26

In the following examples the paper to be evaluated is manufactured on an experimental pilot plant Fourdrinier paper making machine 12 inches in width, the wire of which is moving at a rate of 25 feet per minute. In particular, to a Johnson beater there is charged a pulp slurry having a consistency of about 3 percent which contains about 9 kilograms of bleached sulfite fiber and the slurry is beaten to a Canadian Standard Freeness (C.S.F.) of approximately 400 milliliters. There is then added 10 percent by weight based on the dry pulp of the urea-formaldehyde pigment into the beater containing the beaten slurry over a period of 10 minutes. While it is feasible to add the pigment in either dry form or as an aqueous slurry, in this instance it is added in dry form. The resultant filled pulp slurry is vigorously agitated and then transferred to a holding chest wherein sufficient water is added to provide an aqueous pulp slurry having a consistency of about 1 percent. At this stage, if desired, other additives such as rosin size and/or alum may be incorporated into the pulp slurry. Customarily, alum is added 30 minutes after the addition of rosin size and 30 minutes prior to the manufacture of the paper sheets. The pigmented pulp slurry is passed through a machine chest, diluted with water to a consistency of from about 0.15 to about 0.21 percent pulp by weight and continuously pumped to a head box from which it is fed onto the wire of the 12 inch Fourdrinier paper machine. Water and unretained pigmentary filler is permitted to drain away and the wet paper sheet is then pressed, dried and, optionally, calendered to produce a smoother surface. The paper products thus prepared are given below in Tables III, IV and V wherein data on both calendered and uncalendered paper samples are provided.

TABLE III (Paper Sheets Prepared from 90% Bleached Sulfite Pulp and 10% Filler)

| Example No. | Filler, 10% Dry Basis | Paper Scattering Coefficient × $10^{-2}$ TAPPI ream per lb. | Pigment Scattering Coefficient TAPPI ream per lb. | % Opacity corrected to 50 lb. B.W. | % Brightness | % Retention |
|---|---|---|---|---|---|---|
| 9* | — | 4.60 | — | 78.5 | 95.2 | — |
| 10* | U/F-1 | 7.55 | 0.398 | 86.7 | 97.5 | 84.9 |
| 11* | U/F-2 | 7.14 | 0.368 | 86.2 | 97.1 | 82.4 |
| 12** | — | 4.28 | — | 79.5 | 94.8 | — |
| 13** | U/F-1 | 7.17 | 0.383 | 86.2 | 97.2 | 84.9 |
| 14** | U/F-2 | 6.88 | 0.358 | 86.6 | 97.0 | 82.4 |

* paper sheet is uncalendered
** paper sheet is calendered

TABLE IV (Paper Sheets Prepared from 90% Bleached Sulfite Pulp, 10% Filler and 1% Alum

| Example No. | Filler, 10% Dry Basis | Paper Scattering Coefficient × $10^{-2}$ TAPPI ream per lb. | Pigment Scattering Coefficient TAPPI ream per lb. | % Opacity corrected to 50 lb. B.W. | % Brightness | % Retention |
|---|---|---|---|---|---|---|
| 15* | — | 4.47 | — | 77.3 | 94.6 | — |
| 16* | U/F-1 | 7.92 | 0.423 | 87.4 | 97.0 | 93.5 |
| 17* | U/F-2 | 7.36 | 0.379 | 86.6 | 97.0 | 90.5 |
| 18** | — | 4.10 | — | 78.3 | 93.9 | — |
| 19** | U/F-1 | 7.49 | 0.403 | 86.4 | 96.9 | 93.5 |
| 20** | U/F-2 | 7.04 | 0.366 | 85.7 | 96.6 | 90.5 |

*paper sheet is uncalendered
**paper sheet is calendered

TABLE V (Paper Sheets Prepared from 90% Bleached Sulfite Pulp, 10% Filler, 2% Alum and 1% Rosin Size)

| Example No. | Filler, 10% Dry Basis | Paper Scattering Coefficient × $10^{-2}$ TAPPI ream per lb. | Pigment Scattering Coefficient TAPPI ream per lb. | % Opacity corrected to 50 lb. B.W. | % Brightness | % Retention |
|---|---|---|---|---|---|---|
| 21* | — | 4.53 | — | 78.9 | 92.5 | — |
| 22* | U/F-1 | 7.76 | 0.411 | 86.7 | 96.1 | 90.2 |
| 23* | U/F-2 | 7.55 | 0.392 | 86.9 | 95.9 | 91.6 |
| 24** | — | 4.29 | — | 79.2 | 92.7 | — |
| 25** | U/F-1 | 7.55 | 0.404 | 87.1 | 96.1 | 90.2 |
| 26** | U/F-2 | 7.28 | 0.369 | 86.4 | 95.3 | 91.6 |

*paper sheet is uncalendered
**paper sheet is calendered

From the foregoing data obtained in Examples 9–26, it is readily apparent that the urea-formaldehyde pigments of the present invention are highly self-retained during the paper making process. Furthermore, it is evident that the presence of the urea-formaldehyde pigment contributes significantly to the improvements in opacity and brightness of the paper sheets.

In accordance with the procedure of the foregoing examples, the pigments referred to herein as U/F-1 and U/F-2 are also incorporated with a pulp component comprising 50 percent bleached softwood kraft and 50 percent bleached hardwood kraft to produce a paper product. The resultant filled paper products in each instance are characterized by improved brightness, opacity and an excellent degree of pigment retention without requiring any retention aids.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A paper product comprising a paper pulp and as a pigmentary filler an insoluble, infusible, non-porous, particulate urea-formaldehyde polymer having a molar ratio of urea to formaldehyde ranging from about 1:1.3 to about 1:1.8, a BET specific surface area ranging from about 5 to 50 square meters per gram, an absorption capacity for aqueous starch solution ranging from 3.0 to 8.0 gms/gm pigment, and a mean agglomerate size of 3 to 12 microns, wherein the pigmentary filler is present in amounts of from about 0.5 to about 80 percent by weight based on the weight of the dry pulp.

2. A paper product as defined in claim 1 wherein the urea-formaldehyde polymer has an absorption capacity for aqueous starch solution ranging from 4.0 to 8.0 gms/gm pigment.

3. A paper product as defined in claim 1 wherein the urea-formaldehyde polymer has an absorption capacity for aqueous starch solution ranging from 4.5 to 7.3 gms/gm pigment and a mean agglomerate size of 5 to 10 microns.

4. A paper product as defined in claim 1 wherein the urea-formaldehyde polymer has a BET specific surface area of 10 to 40 $m^2/g$, an absorption capacity for aqueous starch solution of 4.7 to 7.0 gms/gm pigment and a mean agglomerate size of 5.5 to 9.0 microns.

5. A paper product as defined in claim 1 wherein the pigmentary filler is an insoluble, infusible, non-porous, particulate urea-formaldehyde polymer having a molar ratio of urea to formaldehyde of 1:1.5, a BET specific surface area of 28.1 $m^2/g$, an absorption capacity for aqueous starch solution of 5.7 gms/gm pigment and a mean agglomerate size of 8.3 microns.

6. A paper product as defined in claim 1 wherein the pigmentary filler is an insoluble, infusible, non-porous, particulate urea-formaldehyde polymer having a molar ratio of urea to formaldehyde of 1:1.5, a BET specific surface area of 31.8 $m^2/g$, an absorption capacity for aqueous starch solution of 5 gms/gm pigment and a mean agglomerate size of 7 microns.

7. A paper product as defined in claim 1 wherein the pigmentary filler is an insoluble, infusible, non-porous, particulate urea-formaldehyde polymer having a molar ratio of urea to formaldehyde of 1:1.5, a BET specific surface area of 23.2 $m^2/g$, an absorption capacity for aqueous starch solution of 5.2 gms/gm pigment and a mean agglomerate size of 7 microns.

8. A paper product as defined in claim 1 wherein the pigmentary filler is an insoluble, infusible, non-porous, particulate urea-formaldehyde polymer having a molar ratio of urea to formaldehyde of 1:1.5, a BET specific surface area of 28.0 $m^2/g$, an absorption capacity for aqueous starch solution of 6.7 gms/gm pigment and a mean agglomerate size of 6.9 microns.

9. A paper product as defined in claim 1 wherein the pigmentary filler is present in amounts ranging from about 0.5 to about 30 percent by weight based on the weight of dry pulp.

10. A paper product as defined in claim 1 wherein the pigmentary filler is present in amounts ranging from about 0.5 to about 15 percent by weight based on the weight of dry pulp.

* * * * *